United States Patent
Brodnitz et al.

[15] 3,647,481
[45] Mar. 7, 1972

[54] METHOD OF MAKING ALIPHATIC DI- AND TRISULFIDE FLAVORING MATERIALS

[72] Inventors: Michael H. Brodnitz, Matawan; John V. Pascale, Old Bridge, both of N.J.

[73] Assignee: International Flavors & Fragrances, Inc., New York, N.Y.

[22] Filed: June 13, 1969

[21] Appl. No.: 833,158

[52] U.S. Cl. ............................................99/140 R, 260/608
[51] Int. Cl. ............................................................A23l 1/26
[58] Field of Search....................................99/140; 260/608

[56] References Cited

UNITED STATES PATENTS 3,523,975   8/1970   Evers........................................99/140

OTHER PUBLICATIONS

Bernhard, Comparative Distribution Of Volatile Aliphatic Disulfides Derived From Fresh and Dehydrated Onions, J. Food Science, Volume 33 (1968) pp. 298–304

*Primary Examiner*—Morris O. Wolk
*Assistant Examiner*—Warren Bovee
*Attorney*—Brooks, Haidt & Hoffner

[57] ABSTRACT

Processes for the production of alliaceous flavoring compositions comprising reacting specified mixtures of Bunte salts (S-alkyl and/or S-alkylene thiosulfates) wherein the alkyl and alkylene groups contain up to three carbon atoms, with an alkali metal sulfide at temperatures of 0° to 100° C. to obtain a mixture of dialkyl, dialkylene, or alkyl alkylene di- and trisulfides having an alliaceous flavor impression.

10 Claims, No Drawings

METHOD OF MAKING ALIPHATIC DI- AND TRISULFIDE FLAVORING MATERIALS

BACKGROUND OF THE INVENTION

Increasing attention is being devoted to the preparation and utilization of artificial flavoring agents in foodstuffs. In many instances, artificial flavoring agents are much preferred over natural flavoring agents because flavors and foodstuffs can be tailored specifically to a given use and because flavors can be duplicated at will. This latter factor confers a major advantage to artificial food flavoring agents, since natural food flavoring agents such as extracts, essences, concentrates, and the like are often subject to wide variation because of changes in the quality, type, and treatment of the raw materials obtained from crops or other sources subject to the vicissitudes of nature.

Such variation can be, and all too often is, reflected in the end product, and this results in uncertainty as to standardization of formulations and cost of end product, and the like. It is further well recognized that a fundamental problem in the preparation of artificial flavoring agents is the achievement of true flavor reproduction. The problem is complicated in many cases by the lack of specific knowledge as to how flavors are developed in many foods.

Vegetable foodstuffs such as onions and the like are frequently relied upon to contribute significantly to the flavor and aroma impression of foodstuffs. Products such as dehydrated onions have been available for some time to serve as agents to modify and enhance the flavor of meat, vegetable, dairy, and like products. Such dehydrated products have suffered from the disadvantage that when they are reconstituted they do not fully recapture or duplicate the flavor which would be imparted by the use of fresh onions. Moreover, as noted above, there can be considerable variability due to the type of onion which is dehydrated and to the particular processing conditions used.

THE INVENTION

The process of the present invention provides mixtures of organic disulfides and trisulfides particularly useful for providing alliaceous organoleptic properties to foodstuffs. Briefly, the process comprises reacting a mixture of Bunte salts with an alkali metal sulfide utilizing ratios of various alkyl and alkylene groups as hereinafter disclosed at 0° to 100° C. to obtain a mixture of alkyl and/or alkylene disulfides and trisulfides having organoleptic impressions similar to those of natural allliaceous materials. The present invention also contemplates a process comprising adding the disulfide and trisulfide mixture so formed to foodstuffs to provide alliaceous flavors to such foodstuffs. The reaction mixtures and foodstuffs so produced are also contemplated herein, as are certain preferred processes. As used herein, "Bunte salts" will be understood to mean S-alkyl and/or S-alkylene thiosulfates.

The alkyl and alkylene groups utilized herein are those having from one to three carbon atoms in the molecule. Thus, the alkyl groups include methyl, ethyl, propyl, isopropyl, vinyl, propenyl, including allyl, isopropenyl and the like. As used hereinafter, "propenyl" will be used to designate prop-l-en-l-yl and the term "allyl" will be used to designate prop-2-en-l-yl. The preferred alkyl and alkylene groups are methyl, propyl, allyl, and propenyl.

It will be understood from the present disclosure by those skilled in the art that a wide variety of alliaceous flavors can be provided. Thus, depending upon the reactants chosen, their ratios, and the reaction conditions, as described more fully hereinafter, onion, garlic, leek, chive, shallot, scallion, rakkyo, and like flavors can be obtained.

The various alliaceous favors, although recognizable and distinct from one another, nevertheless have a certain similarity so that a wide variation of flavor quality is available according to this invention. Broadly speaking, it is desirable that the mixtures prepared according to the present disclosure for onion flavors comprise from 50 percent to 80 percent disulfide and from 20 to 50 percent trisulfide; those for garlic flavor, from 30 percent to 50 percent disulfide and 30 to 50 percent trisulfide (any balance being provided by monosulfide); those for leek flavor, from 60 to 70 percent disulfide and 30 to 40 percent trisulfide; and those for chive flavor and shallot flavor from 50 percent to 80 percent disulfide and 20 to 50 percent trisulfide. All parts, proportions, percentages, and ratios herein are by weight, unless otherwise indicated.

The preparation of the correct proportions of alkyl and alkylene groups is also a feature of the present invention, as is the distribution of di- and trisulfides as set forth above. Onion flavor mixtures desirably contain from 5 to 50 percent methyl groups and 50 to 95 percent three carbon atom groups with from none up to 40 percent of total aliphatic groups being unsaturated; garlic flavor mixtures, from zero to 50 percent methyl groups and 50 to 100 percent three carbon atom groups with from 50 to 95 percent of the aliphatic groups being unsaturated; leek flavor mixtures, from 5 to 40 percent methyl groups and 60 to 95 percent three carbon atom groups with from zero to 25 percent of the aliphatic groups being unsaturated; chive flavor mixtures from 10 to 30 percent methyl groups, 70 to 90 percent three carbon atom groups, and zero to 20 percent two carbon atom groups with zero to 30 percent of the aliphatic groups being unsaturated; and shallot flavor mixtures from 10 to 30 percent methyl groups, 70 to 90 percent three carbon atom groups with from 40 to 60 percent of the aliphatic groups being unsaturated.

From the foregoing description it can be appreciated that flavor mixtures according to the present invention can broadly contain from zero to 50 percent methyl groups with the balance being three carbon atom aliphatic groups. Of the three carbon atom groups, sufficient are unsaturated so as to comprise from none in the case of some onion or leek flavors up to 100 percent for garlic flavors. Two carbon atom alkyl groups can also be used in small quantities to confer a particular organoleptic impression, although it is generally preferred to have no more than 20 percent of such two carbon atom materials. Where these materials are used, they are substantially fully saturated.

In a particularly preferred aspect of the present invention, the starting materials used are alkyl and/or alkylene halides and an alkali metal thiosulfate. The type and proportions of organic groups are chosen to provide ratios as indicated above. The particular halides used are preferably the chloride, bromide, or iodide, the particular halide being chosen to control the proportions of each di- or trisulfide to be produced.

The halides of the two or more starting materials can be the same or different. Thus, the combinations of iodide and iodide, bromide and bromide, iodide and bromide, iodide and chloride, chloride and chloride, and bromide and chloride can be used. Accordingly, the term halide herein refers to bromide, chloride and iodide.

The alkali metal thiosulfate used is desirably the lithium, sodium, potassium, or rubidium salt, and the sodium salt is generally preferred because of its ready availability.

When the alkyl halide and thiosulfate are the starting materials, a solvent for the reaction mass is utilized as the reaction vehicle. The halides are intimately admixed with the vehicle and then the required quantity of thiosulfate is added, although the order of addition may be reversed if desired. It is preferred that at least a stoichiometric amount of thiosulfate be used, and it is desirable to utilize a slight molar excess of the thiosulfate. It is generally preferred that from 5 to 20 percent excess thiosulfate be used, based upon the amount of halide.

Suitable solvents for use as the reaction vehicle should permit substantial dissolution of the Bunte salt and should be compatible with the other reaction ingredients. Desirable reaction vehicles systems for the halide-thiosulfate reaction include lower alkanol-water mixtures. A preferred solvent system is aqueous ethanol containing 60 percent ethanol.

Thus, the Bunte salt can be formed in situ, desirably by heating the reactants and vehicle under reflux conditions. The reaction is preferably carried out at temperatures ranging from about 0° to about 100° C. When quantities of thiosulfate not greatly in excess of stoichiometric are used, it is generally found that substantial disappearance of the thiosulfate indicates that the Bunte salts have been formed.

When the Bunte salts are used as starting material for the processes of this invention, they are first dispersed or dissolved in an aqueous reaction vehicle compatible with the reactants. It is generally desirable to disperse or dissolve the Bunte salts in the reaction vehicle prior to addition of the alkali metal sulfide. The proportion of sulfide used, based upon the quantity of Bunte salts present, ranges from 1:5 to 5:1. Best overall yields are obtained in the preferred range of about two molar proportions of Bunte salts to one molar proportion of sulfide. It will be understood that when the Bunte salts are formed in situ from the reaction of halide and alkali metal thiosulfate, the reaction mixture is directly treated with sulfide after removal of any nonaqueous solvent to leave aqueous solution. The solvents which can be used for the extraction are generally aliphatic hydrocarbons, chlorinated hydrocarbons, aromatic solvents, and the like, which are readily separated from the aqueous Bunte salt solution by partition extraction.

The alkali metal sulfides used can be lithium, sodium, potassium, and like sulfides, and sodium sulfide is preferred due to ready availability. While smaller quantities of sulfide can be used, it is desirable that the sulfide be present in at least stoichiometric amounts, and quantities up to 20 molar percent excess can be used. It is preferred that the sulfide be used in amounts of from 0 to 5 percent molar excess.

The temperature at which the sulfides are formed can be from 0° to 100° C. At temperatures below this range the reaction becomes unduly slow, while higher temperatures can cause difficulties with the reaction vehicle. The preferred temperature for carrying out the reaction to form sulfides is 25° C.

The concentration of the Bunte salt in the reaction vehicle is preferably as high as possible, although the salt should be substantially fully in solution. Too low a concentration results in large volumes of vehicle which must be removed. The range of concentration used is accordingly one to five molar and the preferred concentration is four to five molar.

The sulfide cannot generally be more concentrated than about two molar, although too low a concentration results in the need to remove greater quantities of vehicle. The range of concentration for the sulfide is accordingly from one-tenth to two molar, and about one-half molar concentrations are preferred.

The pH of the reaction mixture can be varied over a wide range of neutral to alkaline. It is not generally desirable to exceed a pH of 11 and consequently the preferred range of pH is from about 7 to 12. Preferred pH's are those of about 11.

The time of the reaction is dependent upon the temperature. The formation of the Bunte salt takes place by consuming the thiosulfate, so that when approximately stoichiometric quantities of thiosulfate are used, the solution becomes clear when the reaction is complete. This time will vary from 5 minutes to 1 hour, depending upon the alkyl or alkylene halide used. Thus, allyl halide provides a quicker reaction than propyl halide.

The time for formation of the sulfide mixture varies according to the particular sulfide distribution desired. Quantities of trisulfides are formed at the beginning of the reaction, but these can react with sulfite ions formed during production of the trisulfides to provide the disulfide. Accordingly, the faster the trisulfides are removed from the reaction mixture, the greater is the ratio of trisulfide to disulfide. The time can accordingly be varied from substantially instantaneous to 2 hours depending upon the trisulfide/disulfide ratio desired. The substantially instantaneous reaction is achieved by covering the aqueous reaction mixture with a layer of trisulfide solvent, e.g., a hydrocarbon, before addition of the alkali metal sulfide.

The process of this invention provides mixtures containing both di- and trisulfides. The sulfide mixture produced by reaction of the Bunte salts with alkali metal sulfide is removed from the reaction mixture by extraction with a suitable solvent. The use of organic solvents, particularly aliphatic organic solvents, such as isopentane, hexane, petroleum ether, and the like will tend to exclude any inorganic components of the reaction mixture and provide some purification of the sulfides produced. The solvent is then dried over a suitable material such as anhydrous sodium sulfate, magnesium sulfate, calcium chloride, or the like, and the dried solvent is then removed conveniently by an evaporation process such as the use of a turbofilm evaporator.

The remaining mixture of sulfides is then further purified by distillation, extraction, or the like. A preferred purification of the sulfide is carried out by distillation under a high vacuum, preferably a vacuum of 1 mm. Hg or less.

In accordance with a further aspect of the present invention, the novel sulfide mixtures are utilized per se or in combination with other edible materials to impart the desired alliaceous organoleptic impression to foods or other edible materials. Thus, the mixtures herein described can comprise flavor compositions and flavor-enhancing compositions. It will be understood herein that a flavoring composition is one capable of imparting a definite, complete flavor to a tasteless or bland foodstuff, while a flavor-enhancing composition is one capable of reinforcing one or more flavor notes of a natural or other food material which is deficient in such flavor note.

A flavor-enhancing composition would be one useful for improving the flavor of, say, a dehydrated onion product, the flavor of which had been diminished or altered undesirably by the dehydration and/or other processing. It will accordingly be understood that the disclosed sulfide mixtures can be admixed with other flavoring ingredients, carriers, vehicles, and the like to form compositions suitable for imparting a flavor to, enhancing the flavor in, or altering the flavor of, a food composition, and such food compositions and the methods for preparing them are also contemplated herein.

When the sulfide mixtures of this invention are used in flavoring compositions to enhance existing flavors in, or to provide the entire flavor impression to, a foodstuff, the mixtures can be combined with organic acids including fatty, saturated, unsaturated, and amino acids alcohols, including primary and secondary alcohols, esters, carbonyl compounds including aldehydes and ketones, lactones, cyclic organic materials including benzene derivatives, alicyclics, heterocyclics such as furans, pyridines, pyrazines, and the like, other sulfur-containing materials including thiols, monosulfides, and the like, proteins, lipids, carbohydrates, and so-called flavor potentiators such as monosodium glutamate, and the like. It will be appreciated that the types and amounts of materials selected from the foregoing groups will depend upon the precise organoleptic character desired in the finished product and, especially in the case of flavoring compositions used to enhance other flavors, will vary according to the foodstuffs to which the flavor and aroma are to be imparted. Inorganic materials such as sodium chloride, and freshness preservers such as butylated hydroxyanisole, butylated hydroxytoluene, and propyl gallate can be added for their adjuvant or preservative effects on the flavoring compositions or upon the final food composition itself.

As noted above, it can also be desirable to utilize carriers or thickeners such as gum arabic, carrageenen or vehicles such as ethyl alcohol, water, propylene glycol, and the like. When the carrier comprises an emulsion, the flavoring composition can also contain emulsifiers such as sorbitol derivatives, mono- and diglycerides of fatty acids, and the like. With these carriers or vehicles the desired physical form of the composition can be prepared. It will be understood that the mixtures of this invention can be used in spray-dried, liquid, encapsulated, emulsified, and such other forms in which flavorings are added to foodstuffs. The mixtures can be so used alone or in combination with other ingredients set forth herein. It will be understood that the mixtures of this invention can be utilized to provide or supplement alliaceous flavors in sauces such as barbecue and spaghetti sauces, meats such as frozen hamburger patties, freezedried pork chops, and the like, soups, dried soup mixes, dehydrated soup mixes, and the like, gravies, salad dressings, spice mixes for preparation of, for example, vinegar-and-oil salad dressings, spreads such as butter or margarine, spreads for garlic bread, flavors for cottage cheese and other dairy products for salad use, sour cream, cream cheese and other materials for use in dips, and the like.

The amount of the mixtures of this invention should be sufficient to impart the desired alliaceous flavor and aroma qualities to the ultimate foodstuffs in which they are used. It will be appreciated from the present description that this invention relates to all manner of alliaceous products, including onion, garlic, leek, chive, shallot, and scallion flavors, as set forth above.

Thus, a small but effective amount of the mixture sufficient to provide the alliaceous favor note is used. The amount used will vary depending upon the ultimate food composition to be flavored; for example, more may be required in producing a full, rounded flavor from an unflavored material, and less may be required when the mixtures are used to enhance a natural product which is deficient in natural flavor or aroma.

Those skilled in the art will appreciate that the amount of the di- and trisulfide mixtures according to this invention can be varied over a range to provide the desired flavor and aroma. The use of too little of the mixture will not give the full benefit, while too much not only makes the flavor compositions and foodstuffs needlessly costly, but also can overwhelm and unbalance the flavor and aroma so that desirable results are not obtained. It is accordingly desirable that the ultimate food composition contain not more than about $10^{-6}$ parts of the mixture for each part of total composition, and it is generally preferred to use more than about $10^{-8}$ parts in the finished composition. Accordingly, the desirable range in foods of the mixture produced according to this invention is from about $10^{-8}$ to $10^{-6}$ parts of the novel sulfide mixtures produced herein. When these mixtures are added to the foodstuff in the form of a total flavor composition, the amount should be sufficient to impart the requisite flavor and/or aroma note to the food composition so that the flavor and aroma will be balanced in the finished foodstuff. Accordingly, the flavoring compositions of this invention preferably contain from about $10^{-4}$ percent to about $10^{-3}$ percent of the sulfide mixtures, based upon the total weight of the flavoring composition.

The flavoring compositions of the present invention can be added to the foodstuffs by conventional means known in the art. The flavor material of this invention, together with any other liquid if desired, can be admixed with a carrier such as gum arabic, gum tragacanth, carrageenen, and the like, and spray-dried to obtain a particulate solid flavoring material. When a powdered flavor mix is being made, the dried solids and mixtures of this invention are mixed together in a dry blender to obtain uniformity.

When liquid materials are involved in the preparation of foodstuffs, the flavoring materials of this invention can be combined with either the liquid to be used in the finished composition, or alternatively, they can be added with a liquid carrier in which they are dissolved, emulsified, or otherwise dispersed.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

Preparation of Onion Flavor Oil

A 2-liter reaction flask equipped with a mechanical stirrer, reflux condenser, and a thermometer is charged with 85.2 g. (0.6 mole) of methyl iodide, 73.8 g. (0.6 mole) of propyl bromide, and 372 g. (1.50 mole) of sodium thiosulfate pentahydrate, together with 600 ml. of an ethanol-water reaction medium, and the flask is heated to reflux for about ten minutes until a clear solution is obtained. The ethanol is then recovered on a rotary evaporator, and the aqueous solution remaining is extracted with isopentane.

A solution of sodium sulfide is prepared by dissolving 150 g. (0.725 mole) of the sulfide in 1,200 ml. of water. This sulfide solution is then added to the aqueous solution. The emulsion so formed is extracted with isopentane until it is clear. The isopentane layer is then dried with anhydrous sodium sulfate and then removed on the rotary evaporator.

The organic sulfides so obtained are distilled under a high vacuum (less than 1 mm. Hg) to obtain a residue of 78 g., for an 84.5% yield of usable sulfide product based upon the molecular weight of methylpropyltrisulfide.

An analysis of the product shows the following distribution of various sulfides.

| Compound | Amount (%) |
| --- | --- |
| Dimethyl disulfide | Trace |
| Methylpropyl disulfide | 10.0 |
| Dimethyl trisulfide | 6.8 |
| Dipropyl disulfide | 1.4 |
| Methylpropyl trisulfide | 57.3 |
| Dipropyl trisulfide | 24.5 |

The particular distribution of methylpropyl trisulfide and dipropyl trisulfide especially suits the foregoing mixture for use in onion flavoring compositions used to improve the flavor and aroma of dehydrated natural material.

EXAMPLE II

Preparation of Onion Flavor Oil

A Bunte salt is prepared as in Example I by heating together 7.10 g. (0.05 mole) of methyl iodide, 6.15 g. (0.05 mole) of 1-bromopropane, 29.8 g. (0.125 mole) of sodium thiosulfate pentahydrate, and 50 ml. of 60 percent ethanol-water solution. After removal of the ethanol on a rotary evaporator and extraction of the remaining solution with isopentane, the Bunte salt solution is added to 250 ml. of 0.2 M pH 8 phosphate buffer.

The buffered solution is then admixed with 130 ml. of 0.4 M sodium sulfide solution in a one-liter flask with mechanical stirring during 15 minutes. During the addition of the sodium sulfide solution the pH is maintained at 8 by simultaneously adding 2 M hydrochloric acid solution. The final reaction mixture is stirred for one hour at pH 8 and then thrice extracted with 100 ml. portions of ethyl ether. The solution is subsequently dried with anhydrous sodium sulfate. The ethyl ether is then removed on a rotary evaporator.

The sulfides are distilled, and the mixture is found to have the following composition:

| Compound | Amount (%) |
| --- | --- |
| Dimethyl disulfide | 8.2 |
| Methylpropyl disulfide | 14.3 |
| Dimethyl trisulfide | 4.6 |
| Dipropyl disulfide | 1.4 |
| Methylpropyl trisulfide | 52.9 |
| Dipropyl trisulfide | 18.6 |

This composition is regarded as being very similar to the composition produced in Example I, despite the difference in pH, the pH in Example I being greater than 11. The utility of the composition of this Example is substantially the same as that in Example I.

EXAMPLE III

Preparation of Garlic Flavor Oil

The procedure of Example I is repeated utilizing equimolar amounts of methyl iodide and allyl bromide to form the Bunte salts, and then the reaction with sodium sulfide is carried out. An analysis of the product shows the following distribution of various sulfides:

| Compound | Amount (%) |
| --- | --- |
| Dimethyl disulfide | 9.2 |
| Allyl methyl disulfide | 9.2 |
| Diallyl disulfide | 2.7 |
| Dimethyl trisulfide | 12.1 |
| Allyl methyl sulfide | 50.1 |
| Diallyl trisulfide | 16.7 |

This material has an excellent garlic flavor character and is useful in the preparation of dairy products, such as cheese dips and cottage cheese, having a garlic flavor character.

EXAMPLE IV

Preparation of Chive Flavor Material

The procedure of Example I is repeated with the sodium sulfide solution permitted to remain in contact with the Bunte salts for 72 hours. The product shows the following distribution of various sulfides:

| Compound | Amount (%) |
| --- | --- |
| Dimethyl disulfide | 12.9 |
| Methyl propyl disulfide | 60.5 |
| Dipropyl disulfide | 15.1 |
| Dipropyl trisulfide | 11.5 |

Substantially no methyl-containing trisulfides are obtained. This material has an excellent chive flavor character and is useful in the preparation of dairy products, such as cottage cheese and the like, having a chive flavor character.

EXAMPLE V

Mixed Bunte salts are prepared by admixing 31 ml. (0.5 mole) of methyl iodide and 46 ml. (0.5 mole) of propyl bromide with 278 g. (1.1 mole) of sodium thiosulfate pentahydrate in 500 ml. of 60 percent aqueous ethanol. The mixture is heated until the solution is clear, and 600 g. of aqueous solution is obtained. To 300 g. of aqueous solution is added 66 g. of sodium sulfide nonahydrate in 500 ml. of water with stirring.

After 24 hours the sample is extracted with isopentane, and the isopentane mixture is dried over anhydrous sodium sulfate. The isopentane is stripped off to provide 20.0 g. of oil having the following distribution of sulfides:

| Compound | Amount (%) |
| --- | --- |
| Dimethyl disulfide | 9.4 |
| Methyl propyl disulfide | 55.3 |
| Dipropyl disulfide | 26.3 |
| Methyl propyl trisulfide | 9.0 |

The foregoing mixture is an excellent onion flavoring material.

EXAMPLE VI

A mixture of 24.6 g. (0.2 mole) of 1-bromo-propane, 7.8 g. (0.05 mole) of ethyl iodide, 28.4 g. (0.2 mole) of methyl iodide, and 124 g. (0.5 mole) of sodium thiosulfate pentahydrate with 200 cc. of 60 percent aqueous ethanol is prepared in a 500 ml. flask provided with a mechanical stirrer, reflux condenser, and nitrogen blanket. The mixture is stirred and heated to reflux. The ethanol is removed by rotary evaporation after the solution becomes clear.

The remaining aqueous solution is treated with 52.8 g. (0.27 mole) of sodium sulfide nonahydrate, and an emulsion forms. The emulsion is extracted with isopentane and the isopentane extract is dried with anhydrous magnesium sulfate. The isopentane is stripped from the mixture to obtain 16 g. of oil having the following analysis:

| Compound | Amount (%) |
| --- | --- |
| Diethyl disulfide | 0.3 |
| Ethyl propyl disulfide | 0.5 |
| Methyl propyl disulfide | 5.8 |
| Ethyl methyl disulfide | 0.6 |
| Dipropyl disulfide | 1.7 |
| Dimethyl disulfide | 1.7 |
| Diethyl trisulfide | 4.8 |
| Diethyl trisulfide | 18.5 |
| Ethyl propyl trisulfide | 3.9 |
| Ethyl methyl trisulfide | 4.2 |
| Methyl propyl trisulfide | 39.7 |
| Dipropyl trisulfide | 18.3 |

This material has an excellent chive flavor character and is useful as indicated above for flavoring dairy products and the like.

EXAMPLE VII

The composition of Example I is dissolved in propylene glycol in amount sufficient to give a propylene glycol solution containing 0.1 percent by weight of said mixture. 0.9 cc. of this solution is added to 7.3 g. of a soup base consisting of:

| Ingredient | Quantity (parts) |
| --- | --- |
| Fine ground sodium chloride | 35.62 |
| Hydrolyzed vegetable protein (Nestle 4 BE) | 27.40 |
| Monosodium glutamate | 17.81 |
| Sucrose | 10.96 |
| Beef fat | 5.48 |
| Sethness caramel color powder B & C) | 2.73 |

The resulting mixture is added to 12 ounces of boiling water to create a soup having an excellent onion flavor.

The composition of Example II is added to the above soup base, and the mixture is then added to boiling water to provide a soup having a good onion flavor. Similar results are obtained when the material prepared according to Example V is used or when materials from Examples I and V are used in combination with each other.

EXAMPLE VIII

One-half gram of the mixture of Example II is emulsified in a solution containing the following materials:
- 100 g. gum arabic
- 300 g. water
- 0.5 g. 20 percent solution in ethanol of butylatedhydroxyanisole.

The resultant emulsion is spray-dried in a Bowen Lab Model spray-drier with inlet temperature of 500° F., and outlet temperature of 200° F. Twelve grams of this spray-dried material is mixed with 29.2 grams of the soup base set forth in Example VII. The resulting mixture is then added to 12 ounces of boiling water, and an excellent onion-flavored soup is obtained.

EXAMPLE IX

A "gelatin solution" is prepared by dissolving 330 g. of gelatin at 40° C. in 8,250 g. of deionized water, and 330 g. of spray-dried gum arabic is dissolved at room temperature in 8,250 g. of deionized water to form a "gum arabic solution." The gum arabic solution is placed in a 30 liter vessel and 2.5 liters of the gelatin solution is added. The temperature of the mixture is adjusted to 37° to 40° C. Through a tube beneath the surface of the gum arabic solution, 4,000 g. of 0.1 percent (by weight) solution of the mixture of Example III in propylene glycol is added over a period of approximately 30 minutes.

The mixture is agitated at 37° to 40° C. until an average droplet size of 25 microns is obtained. The remaining gelation solution (6 liters) is then added. The pH of the solution is then adjusted to 4.5 to 4.6, with a 10 percent sodium hydroxide solution.

After the 25 micron droplet size is achieved, the temperature is allowed to drop to 25° C. over a period of approximately 2.5 hours while maintaining the pH at 4.5 to 4.6. The capsule slurry is then stirred and cooled to 5° C. and is maintained at 5° C., with stirring, for at least 2.5 hours. The slurry is then spray-dried.

The capsules thus formed are filtered and mixed with a vegetable soup base in the weight ratio of 1:6. Twenty grams of the resulting capsule-soup base mixture is then added to 30 ounces of boiling water thereby creating a soup having an excellent flavor with garlic seasoning.

What is claimed is:

1. A process for the ͺ           ͵ous flavoring materials which comprises reacting a mixture of aliphatic thiosulfates (Bunte salts) with an alkali metal sulfide to obtain a mixture of aliphatic disulfides and trisulfides, wherein the aliphatic groups are at least two different alkyl or alkylene groups having from one to three carbon atoms and the amount of disulfide comprising from 30 to 80 percent of the mixture so obtained.

2. A process according to claim 1 wherein from zero to 50 percent of the aliphatic groups are methyl, from zero to 20 percent of the aliphatic groups contain two carbon atoms, and the remainder of the aliphatic groups contain three carbon atoms.

3. A process according to claim 1 wherein from zero to 50 percent of the aliphatic groups are methyl, and the remainder of the aliphatic groups contain three carbon atoms.

4. A process according to claim 1 for the production of an onion flavoring material wherein from 5 to 50 percent of the aliphatic groups are methyl, from 50 to 95 percent of the aliphatic groups contain three carbon atoms, and from zero to 40 percent of the aliphatic groups are unsaturated.

5. A process according to claim 1 for the preparation of garlic flavoring material wherein from zero to 50 percent of the aliphatic groups are methyl, from 50 to 100 percent of the groups contain three carbon atoms, and from 50 to 95 percent of the aliphatic groups are unsaturated.

6. A process according to claim 1 for the preparation of a leek flavoring material wherein from 5 to 40 percent of the aliphatic groups are methyl, from 60 to 95 percent of the aliphatic groups contain three carbon atoms and from zero to 25 percent of the aliphatic groups are unsaturated.

7. A process according to claim 1 for the preparation of chive flavoring materials wherein from 10 to 30 percent of the aliphatic groups are methyl groups, from zero to 20 percent of the aliphatic groups contain two carbon atoms, and from 70 to 90 percent of the aliphatic groups contain three carbon atoms and from zero to 30 percent of the aliphatic groups are unsaturated.

8. A process according to claim 1 for the preparation of a shallot flavoring material wherein from 10 to 30 percent of the aliphatic groups are methyl, from 70 to 90 percent of the aliphatic groups contain three carbon atoms, and from 40 to 60 percent of the aliphatic groups are unsaturated.

9. A process according to claim 1 wherein the aliphatic thiosulfates are obtained by heating a mixture of alkyl halides, a mixture of alkylene halides, or a mixture of alkyl and alkylene halides with an alkali metal thiosulfate.

10. A process according to claim 1 wherein the temperature is from 0° to 100° C.

* * * * *

PO-1050
(5/69)

UNITED STATES PATENT OFFICE
CERTIFICATE OF CORRECTION

Patent No. 3,647,481            Dated    March 7, 1962

Inventor(s) MICHAEL H. BRODNITZ and JOHN V. PASCALE

It is certified that error appears in the above-identified patent and that said Letters Patent are hereby corrected as shown below:

Column 4, line 42, insert a comma (,) after "acids" and before "alcohols".

Column 7, line 31, "12.9" should be removed from under the heading "Compound" and placed under the heading "Amount (%)".

Column 8, line 16, "Diethyl" should read --Dimethyl--.

Column 9, claim 1, line 23, the whole line should read as follows:

"1. A process for the production of alliaceous flavoring"

Column 10, claim 5, lines 10-11, insert "aliphatic" after "the" (line 10) and before "groups" (line 11).

Signed and sealed this 11th day of July 1972.

(SEAL)
Attest:

EDWARD M. FLETCHER, JR.        ROBERT GOTTSCHALK
Attesting Officer              Commissioner of Patents